United States Patent
Mori et al.

(10) Patent No.: US 9,752,609 B2
(45) Date of Patent: Sep. 5, 2017

(54) THREADED FASTENER

(71) Applicant: TOPURA CO., LTD., Hadano-shi, Kanagawa (JP)

(72) Inventors: Shigeto Mori, Hadano (JP); Hiroshi Nakano, Hadano (JP); Yosuke Okamura, Hadano (JP); Seiya Hoshino, Hadano (JP)

(73) Assignee: TOPURA CO., LTD., Hadano-shi, Kanagawa (JP)

( * ) Notice: Subject to any disclaimer, the term of this patent is extended or adjusted under 35 U.S.C. 154(b) by 0 days.

(21) Appl. No.: 14/903,553

(22) PCT Filed: Jul. 8, 2014

(86) PCT No.: PCT/JP2014/068197
§ 371 (c)(1),
(2) Date: Jan. 7, 2016

(87) PCT Pub. No.: WO2015/005347
PCT Pub. Date: Jan. 15, 2015

(65) Prior Publication Data
US 2016/0169263 A1 Jun. 16, 2016

(30) Foreign Application Priority Data
Jul. 8, 2013 (JP) .................... 2013-142757

(51) Int. Cl.
*F16B 35/04* (2006.01)
*F16B 39/30* (2006.01)
*B21H 3/02* (2006.01)

(52) U.S. Cl.
CPC ............. *F16B 35/048* (2013.01); *B21H 3/02* (2013.01); *F16B 39/30* (2013.01)

(58) Field of Classification Search
CPC ........ F16B 35/005; F16B 35/04; F16B 35/041; F16B 35/048; B21H 3/02
(Continued)

(56) References Cited

U.S. PATENT DOCUMENTS 2,167,558 A * 7/1939 Upson ................. F16B 25/0021
411/411
2,777,718 A * 1/1957 Vegren .................... F16B 21/06
285/318

(Continued)

FOREIGN PATENT DOCUMENTS

JP S48-013329 Y1 4/1973
JP H11-125225 A 5/1999
(Continued)

OTHER PUBLICATIONS

Machine translation (Google translation) by Patentscope of WO2005/011892A1, pub'd Feb. 10, 2005 (Description, p. 1, line 1 to p. 3, line 22).

*Primary Examiner* — Roberta Delisle
(74) *Attorney, Agent, or Firm* — Harness, Dickey & Pierce, P.L.C.

(57) ABSTRACT

A threaded fastener is provided in which a head bearing surface can be in full intimate contact with a counterpart. The threaded fastener is provided with a head (10), and a screw shank (20) extending from the head (10). The screw shank (20) is provided with a parallel thread portion (22) having a complete screw thread formed therein, a neck portion (24) having no screw thread, a transition thread portion (26) having an incomplete screw thread formed to extend from the parallel thread portion (22) toward the neck portion (24) with its root diameter being the same as that of the complete screw thread and with its thread height gradually becoming lower to reach the neck portion, and an underneck rounded portion (28) formed in a corner angle (Continued)

portion between the neck portion (24) and a head bearing surface (11), wherein the neck portion (24) is work hardened with its diameter being narrowed from a root diameter of the parallel thread portion (22).

6 Claims, 3 Drawing Sheets

(58) Field of Classification Search
 USPC .......................................... 411/393, 411, 424
 See application file for complete search history.

(56) References Cited

U.S. PATENT DOCUMENTS

| | | | | | |
|---|---|---|---|---|---|
| 3,129,963 | A | * | 4/1964 | Robbins | F16L 15/001 285/334 |
| 3,455,587 | A | * | 7/1969 | Gallois | F16B 33/02 403/408.1 |
| 4,018,132 | A | * | 4/1977 | Abe | F16B 5/0275 411/413 |
| 4,212,224 | A | * | 7/1980 | Bragg, Jr. | F16B 41/002 411/113 |
| 4,485,510 | A | * | 12/1984 | Hatter | B21H 3/02 470/9 |
| 4,917,555 | A | * | 4/1990 | Taubert | F16B 5/0275 411/168 |
| 4,957,401 | A | * | 9/1990 | Hatter | B21H 3/02 411/411 |
| 5,340,254 | A | * | 8/1994 | Hertel | F16B 25/0021 411/311 |
| 5,782,595 | A | * | 7/1998 | Schneider | F16B 5/025 411/107 |
| 6,125,526 | A | * | 10/2000 | Wierzchon | F16B 5/0275 29/525.02 |
| 6,164,887 | A | * | 12/2000 | Palm | F16B 23/00 411/387.7 |
| 6,174,117 | B1 | * | 1/2001 | Kawatani | B23P 11/00 411/107 |
| 7,326,014 | B2 | * | 2/2008 | Levey | F16B 31/04 411/307 |
| 8,506,227 | B2 | * | 8/2013 | Karupaya | B21H 3/06 411/411 |
| 2006/0263171 | A1 | * | 11/2006 | Schwarz | F16B 25/0047 411/411 |
| 2010/0196121 | A1 | * | 8/2010 | Karupaya | F16B 25/0047 411/402 |
| 2011/0158767 | A1 | * | 6/2011 | Elkins | B21H 7/002 411/424 |
| 2011/0188964 | A1 | * | 8/2011 | Hung | C22C 23/00 411/393 |
| 2013/0230366 | A1 | | 9/2013 | Miyamoto | |

FOREIGN PATENT DOCUMENTS

| | | |
|---|---|---|
| JP | 2002147425 A | 5/2002 |
| JP | 201210127 A | 5/2012 |
| WO | 2005011892 A1 | 2/2005 |

\* cited by examiner (A)

(B)

(A)

(B)

PRIOR ART

THREADED FASTENER

CROSS-REFERENCE TO RELATED APPLICATIONS

This application is a National Stage of International Application No. PCT/JP2014/068197, filed Jul. 8, 2014, which claims priority to Japanese Application No. 2013-142757, filed Jul. 8, 2013. The entire disclosures of each of the above applications are incorporated herein by reference.

FIELD

The present disclosure relates to a threaded fastener in which a screw thread is formed by form-rolling up to the vicinity of a head bearing surface.

BACKGROUND

As such a kind of conventional threaded fastener, there has been known a full thread bolt as described in a first patent literature, for example. The full thread bolt described in this first patent literature has a screw thread formed on a screw shaft or shank with a length extending up to near a bearing surface of a head, and in addition, also has a "connecting insertion portion" of the same diameter as that of a thread root formed between the head bearing surface and a thread terminal end of an incomplete thread portion.

The "connecting insertion portion" in this first patent literature means an unthreaded neck portion in the vicinity of the head bearing surface, wherein it is constructed such that the root diameter of the incomplete thread portion and the diameter of the neck portion are the same as the thread root diameter so as to keep a screw thread (crest) at the side of an internal screw thread from interfering with the root portion of the incomplete thread portion, so that in cases where the bolt is threadedly engaged with a nut, the head bearing surface of the bolt is placed in intimate contact with a bearing surface of the nut.

However, in the case of the full thread bolt in this first patent literature, for example, as shown in FIG. 3, the incomplete thread portion (denoted by 126) and the neck portion (denoted by 124) of the bolt (denoted by 101) do not interfere with the screw thread of the nut (denoted by 130), but there exists an underneck rounded portion 128 in the base of the neck 124, as a result of which finally, there arises a problem that this underneck rounded portion 128 interferes with an opening edge of an internal screw threaded hole, so that the head bearing surface (denoted by 111) is not completely placed in intimate contact with the bearing surface of the nut 130. The use of a large tightening torque can provide intimate contact therebetween, but there is a fear that the underneck rounded portion 128 or the opening rim or edge of the nut may be damaged.

Accordingly, it can be considered to cut the neck 124 and the underneck rounded portion 128 of the bolt so as to make them slim, but in this case, there is a fear that the strength of the bolt may drop, and moreover, stress may be concentrated on the neck portion 124 to fracture it.

CITATION LIST

Patent Literature

First Patent Document: Japanese Patent Laid-Open Publication No. 2002-147425

SUMMARY

Technical Problem

The present disclosure has been made so as to solve the problems of the conventional techniques as referred to above, and has for its object to provide a threaded fastener of high strength which is capable of providing full intimate contact of a head bearing surface.

Solution to Problem

In order to achieve the above-mentioned object, the present disclosure resides in a threaded fastener which is provided with a head and a screw shank extending from said head, wherein said screw shank is formed with a parallel thread portion having a complete screw thread formed therein, a neck portion having no screw thread, a transition thread portion having an incomplete screw thread formed to extend from said parallel thread portion toward said neck portion with its root diameter being the same as that of said complete screw thread and with its thread height gradually becoming lower to reach said neck portion, and an underneck rounded portion formed in a corner angle portion between said neck portion and a head bearing surface, said threaded fastener being characterized in that said neck portion is work hardened with its diameter being slenderly narrowed from a root diameter of said parallel thread portion.

It is preferable that the diameter of said neck portion be set to 96%-98% of the root diameter of said parallel thread portion.

Advantageous Effects of Disclosure

According to the present disclosure, the diameter of the neck portion is set to be smaller than the root diameter of the parallel thread portion, so that the diameter of the neck portion is smaller than an inside diameter of an internal screw fitted thereon, and the neck portion does not basically interfere with a screw thread of the internal screw. The underneck rounded portion takes a shape in which the diameter thereof increases toward the head bearing surface in a circular arc shape, and the diameter of the neck portion is smaller than the root diameter of the parallel thread portion, as a result of which the underneck rounded portion will enter an internal threaded hole in an internal thread products without causing interference therewith, and a portion thereof close to the head bearing surface will be in a state spreading or widening toward, and finally becoming nearly parallel to, the head bearing surface, so that interference of the underneck rounded portion with the screw thread of the internal thread products can be avoided, and the head bearing surface can be made in full intimate contact with the bearing surface of the internal thread products.

In addition, even if the diameter of the neck portion is smaller than the root diameter of the parallel thread portion, the strength thereof is set to be higher than the parallel thread portion by means of the work hardening of the neck portion. As a result, in the case of a fracture or break of the threaded fastener, it is fractured or broken in the parallel thread portion, and there is no fear that the threaded fastener may be fractured or broken in the neck portion and the head may be disconnected or separated from a fastening portion, and hence, the threaded fastener is high in safety.

When the diameter of the neck portion is set to be about 98% or less of the root diameter of the parallel thread portion, an improvement in strength due to work hardening will be sufficient. In particular, when the diameter of the neck portion is made to be too small, the extent of work hardening will become large, but the cross-sectional area of the neck portion will be decreased, so the strength thereof will tend to drop. As a result, it is effective to set the diameter of the neck portion to be about 96%-98% of the root diameter of the parallel thread portion.

DRAWINGS

DETAILED DESCRIPTION

Hereinafter, the present disclosure will be described in detail based on a preferred embodiment thereof as illustrated.

Figure 1:
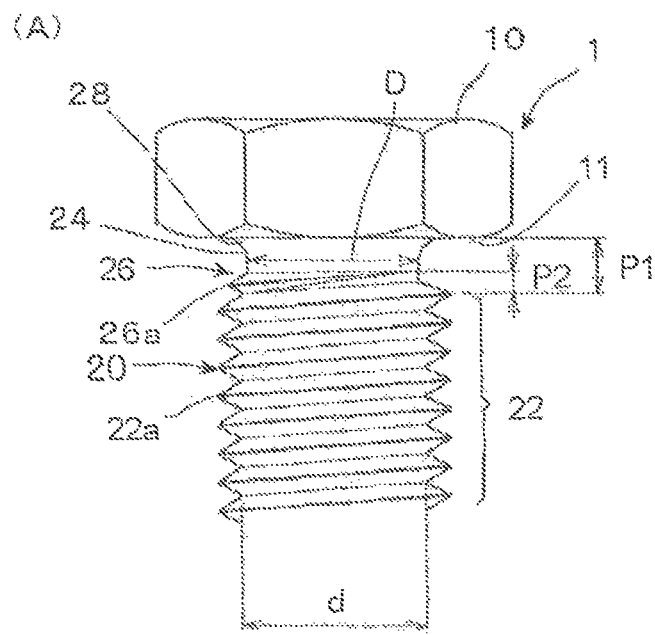
FIG. 1(A) is a general view showing a threaded fastener according to an embodiment of the present disclosure.
FIG. 1(B) is a view showing a fastened state thereof.
Figure 1:
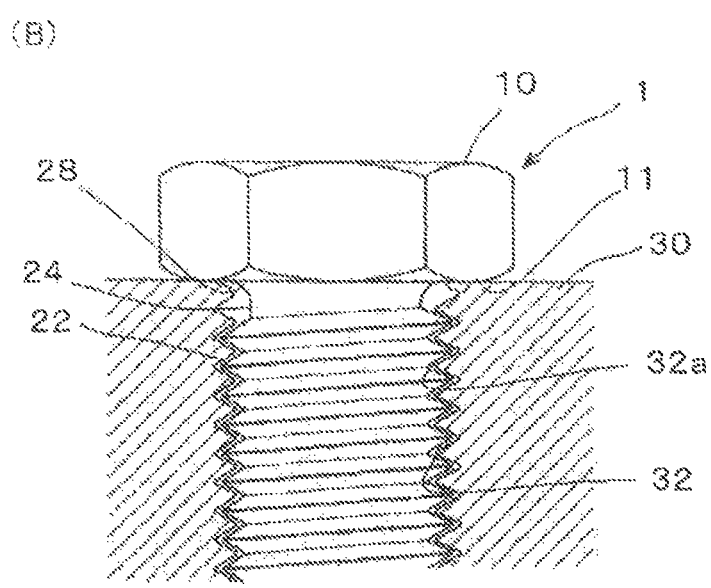

FIG. 1 shows a threaded fastener according to the embodiment of the present disclosure. In this figure, 1 denotes the threaded fastener, and this threaded fastener 1 is provided with a head 10, and a screw shaft or shank 20 extending from the head 10, wherein the screw shank 20 is provided with a parallel thread portion 22 having a complete screw thread 22a formed therein, a neck portion 24 having no screw thread, a transition thread portion 26 having an incomplete screw thread 26a formed to extend from the parallel thread portion 22 toward the neck portion 24, and an underneck rounded portion 28 formed in a corner angle portion between the neck portion 24 and a head bearing surface 11.

In the present disclosure, the neck portion 24 is work hardened with its diameter D being slenderly narrowed from a root diameter d of the parallel thread portion 22. It is preferable that the diameter of the neck portion 24 be set to 96%-98% of the root diameter of the parallel thread portion 22.

In this embodiment, a hexagon head bolt is mentioned as an example of the threaded fastener 1, and the head 10 takes a hexagonal prism shape, and the head bearing surface 11 at an undersurface of the head 10 protrudes in a direction orthogonal to the central axis of the screw shank 20. Of course, the threaded fastener 1 is not necessarily limited to the hexagon head bolt, and the shape of the head thereof is not limited in particular.

The transition thread portion 26 takes a shape in which the root diameter thereof is the same as the root diameter of the parallel thread portion 22, and the height of the incomplete screw thread 26a thereof becomes gradually lower in a direction from the parallel thread portion 22 to the neck portion 24, and the shape or profile of a screw thread of the transition thread portion 26 is a continuous screw thread shape without distortion.

The neck portion 24 has a slenderly narrowed cylindrical surface of a circular cross section smaller than the root diameters of the parallel thread portion 22 and the transition thread portion 26. The underneck rounded portion 28 of an arc shaped cross section is formed in a root or joint portion of the neck portion 24 in which it is joined or connected with the head bearing surface. The underneck rounded portion 28 is preformed at the time of working of the head, and is finish formed at the time of form-rolling thereof.

The underneck rounded portion 28 has a spreading shape which spreads or widens circularly toward the head bearing surface 11 more largely as approaching the head bearing surface 11.

In this example, the neck portion 24 is formed into the cylindrical surface, but instead, the neck portion 24 may curve in a concave manner. In addition, in cases where the length of the neck portion 24 is short, the neck portion may be formed by a part of the underneck rounded portion 28.

In this embodiment, a distance P1 from the head bearing surface 11 to a terminal end of the complete screw thread 22a (i.e., a transition starting position to the incomplete screw thread 26a) is set to be within 1.5 pitches, and an axial range or length of the transition thread portion 26, i.e., a distance P2 from the terminal end of the complete screw thread 22a to a terminal end of the incomplete screw thread, is set to be about 1 pitch, wherein the neck portion 24 and the underneck rounded portion 28 are continuously formed in a range from the terminal end of the incomplete screw thread 26a to the head bearing surface 11.

The above-mentioned distance P1 from the head bearing surface 11 to the terminal end of the complete screw thread 22a is set according to the thicknesses of sheet metal products to be fastened together and a clamping force acting therebetween. In the case of obtaining a high clamping force, the screw thread may be subjected to shear fracture, so it is necessary to secure as many threads per inch of the complete screw thread as possible in a nut (internal screw).

The range of the transition thread portion 26 being 50 degrees or below is difficult to be worked due to the relation between the thread height and the circumferential length of the screw thread outer profile in a small-diameter bolt, and hence, it is preferable that the range of the transition thread portion 26 be set to be equal to or more than 50 degrees, and the range may be about 180 degrees to 360 degrees (one revolution or turn), and can be set as appropriate.

The parallel thread portion 22 and the transition thread portion 26 of this screw shank 20 are formed by form-rolling, and the neck portion 24 is also formed by form-rolling at the time of the form-rolling of the parallel thread portion 22 and the transition thread portion 26. The form-rolling, though not illustrated in particular, is carried out with the use of a form-rolling die in such a manner that the root diameter of the transition thread portion 26 is made to be equal to the root diameter of the parallel thread portion 22.

The underneck rounded portion 28 is preformed at the time of working of the head, and is finish formed at the time of form-rolling thereof.

Next, reference will be made to the operation of the threaded fastener according to this embodiment.

As shown in (B) in FIG. 1, assuming the case where the threaded fastener (such as a bolt) is tightened into an internal threaded or tapped hole 32 of an internal thread products 30 such as a nut, etc., the screw shank 20 has the root diameter of the same or constant value which continues from the parallel thread portion 22 to the transition thread portion 26, so that it is inserted into the internal threaded hole 32 up to the transition thread portion 26, without interfering with the screw thread 32a of the internal threaded hole 32, and is further inserted into up to the neck portion 24 without interfering therewith, due to the fact that the diameter of the neck portion 24 is smaller than the root diameter of the parallel thread portion 22.

Further, the underneck rounded portion 28 takes a shape in which the diameter thereof increases toward the head bearing surface 11 in a circular arc shape, and the diameter of the neck portion 24 is smaller than the root diameter of the parallel thread portion 22, as a result of which the underneck rounded portion 28 comes into the internal threaded hole 32 without any interference, so that a portion thereof close to the head bearing surface 11 will be in a state nearly parallel to the head bearing surface 11 in a shape widening to the end. Thus, interference of the underneck rounded portion 28 with the screw thread 32a of the internal thread products 30 can be avoided, and the head bearing surface 11 can be made in full intimate contact with the bearing surface 30 of the internal thread products 30, thereby making it possible to increase the tightening force.

In addition, even though the diameter of the neck portion 24 is smaller than the root diameter of the parallel thread portion 22, the strength thereof is set to be higher than the parallel thread portion 22 by means of the work hardening of the neck portion 24, as a result of which in the case of a fracture or break of the threaded fastener, it is fractured or broken in the parallel thread portion 22, and there is no fear that the threaded fastener may be fractured or broken in the neck portion 24 and the head 10 may be disconnected or separated from a fastening portion, and hence, the threaded fastener is high in safety.

With respect to this, when compared with a conventional threaded fastener, in the past, a neck portion of the fastener is assumed to have about the same diameter as the root diameter of a parallel thread portion thereof, so that the neck portion can be inserted into a threaded hole of a counterpart or internal thread products, but finally, an underneck rounded portion of the fastener will interfere with the counterpart or internal thread products and a minute gap will occur between a head bearing surface of a head and an opposed surface of the counterpart or internal thread products. When tightening torque is made high, the gap will be able to be eliminated, but a screw thread of a portion of the counterpart or internal thread products which interfere with the underneck rounded portion will be partially crushed.

Moreover, assuming the case where thin plates such as thin sheet steels are fastened to each other, the threaded fastener of the present disclosure is basically able to be threadedly inserted into the counterpart internal screw products until the head bearing surface of the head comes into intimate contact with the opposed surface of the counterpart internal thread products, and hence, plate members of any thickness can be fastened together.

Figure 2:
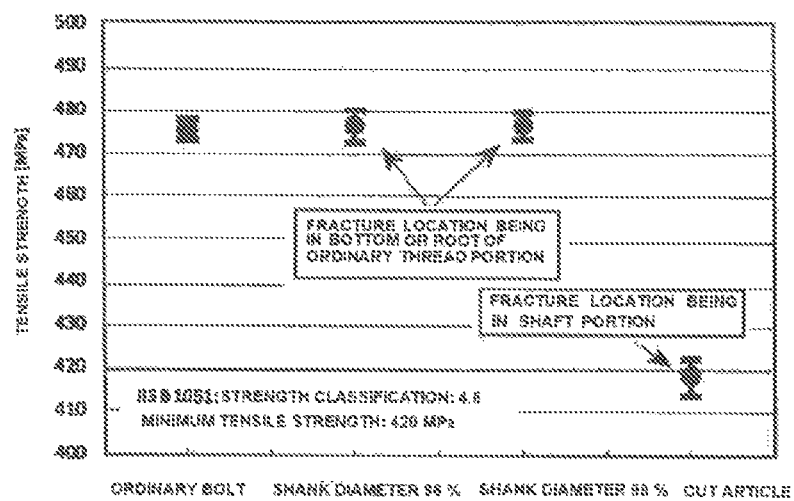
FIG. 2(A) is a graph showing the results of tensile tests for entire screws of the threaded fastener of the present disclosure and a conventional threaded fastener.
FIG. 2(B) is a graph showing the results of tensile tests for a neck portion of the threaded fastener of the present disclosure.
Figure 2:
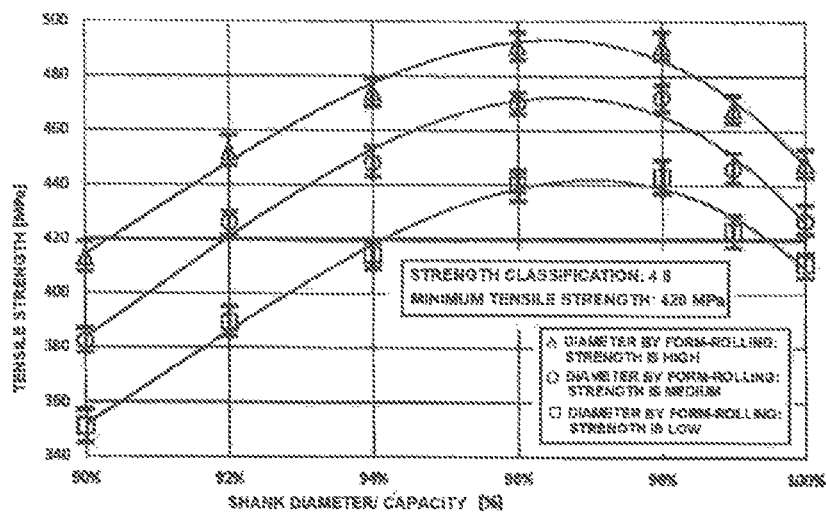
Figure 3:
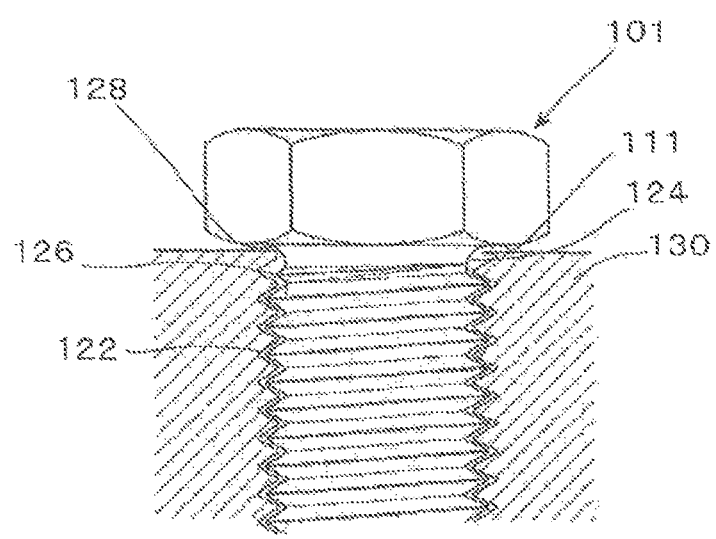
FIG. 3 is a view showing an interfering state of an underneck rounded portion in the conventional threaded fastener.

FIG. 2 shows by comparison the results of tension tests of entire screw threads, for an ordinary or conventional rolled bolt, an article with a narrowed or reduced neck portion produced according to the present disclosure, and a cut article produced by narrowing a neck portion by means of cutting.

In the cut article, the tensile strength thereof became lower with respect to the conventional rolled bolt, and a fracture occurred in the neck portion thereof, but in contrast to this, in the case of the article of the present disclosure, the neck portion thereof, though being thin and narrow, has a tensile strength equivalent to the conventional rolled bolt, and besides, a fracture occurred in the thread portion, and so, even in the case of the fracture, there is no fear that a fastening or joint portion may be disconnected or separated.

FIG. 2 shows the results of tension tests for the neck portion 24 of the article of the present disclosure.

Samples were prepared of which the diameters of the neck portions formed by form-rolling were high, medium, and low in strength, and tests were carried out by changing the drawing rate or contraction percentage (percent reduction of area). The sample of the article of the present disclosure in (A) in the above-mentioned FIG. 2 was high in the strength of the diameter of the neck portion by form-rolling.

As is clear from this graph, the tensile strength of the neck portion 24 goes up gradually as the diameter thereof is made smaller, so that the tensile strength becomes a maximum between 96%-98%, and thereafter, the tensile strength tends to decrease gradually as the contraction percentage (percent reduction of area) of the neck portion 24 becomes larger. The decreasing of the tensile strength is due to the fact that the cross-sectional area of the neck portion 24 decreases, though the extent of work hardening thereof becomes higher, and hence, when the diameter of the neck portion 24 is set to be about 96%-98% with respect to the root diameter of the parallel thread portion 22, a maximum magnitude (tensile strength) can be obtained.

Here, note that the present disclosure is not limited to the above-mentioned embodiment, but various kinds of shapes and structures can be selected within a scope which does not depart from the gist of the present disclosure.

REFERENCE SIGNS LIST 1 threaded fastener
10 head
11 head bearing surface
20 screw shank
22 parallel thread portion
24 neck portion
26 transition thread portion
26a incomplete screw thread
28 underneck rounded portion
30 internal thread products
32 internal threaded hole
32a screw thread
d root diameter of the parallel thread portion
diameter D of the neck portion
P1 distance from the head bearing surface 11 to a terminal end of the complete screw thread 22a
P2 distance from the terminal end of the complete screw thread 22a to a terminal end of an incomplete screw thread

The invention claimed is:

1. A threaded fastener which is provided with a head and a screw shank extending from said head, wherein said screw shank is provided with a parallel thread portion having a complete screw thread formed therein, a neck portion having no screw thread, a transition thread portion having an incomplete screw thread formed to extend from said parallel thread portion toward said neck portion with its root diameter being the same as that of said complete screw thread and with its thread height gradually becoming lower to reach said neck portion, and an underneck rounded portion formed in a corner angle portion between said neck portion and a head bearing surface,
  wherein said neck portion is work hardened with its diameter being slenderly narrowed from the root diameter of said parallel thread portion such that the diameter of said neck portion is set to 96%-98% of the root diameter of said parallel thread portion; and the strength of said neck portion is made to be higher than that of each of the thread portions so that a fracture position in the case where said screw shank is fractured is made to be in said parallel thread portion.

2. The threaded fastener according to claim 1, wherein said parallel thread portion and said transition thread portion are formed by form-rolling.

3. The threaded fastener according to claim 2, wherein the distance of said head bearing surface to a terminal end of the complete screw thread of said parallel thread portion is within 1.5 pitches.

4. The threaded fastener according to claim 1, wherein the distance of said head bearing surface to a terminal end of the complete screw thread of said parallel thread portion is within 1.5 pitches.

5. A method for manufacturing a threaded fastener which is provided with a head and a screw shank extending from said head, wherein said screw shank is provided with a parallel thread portion having a complete screw thread formed therein, a neck portion having no screw thread, a transfer thread portion having an incomplete screw thread formed to extend from said parallel thread portion toward said neck portion with its root diameter being the same as that of said complete screw thread and with its thread height gradually becoming lower to reach said neck portion, and an underneck rounded portion formed in a corner angle portion between said neck portion and a head bearing surface, wherein said neck portion is work hardened with its diameter being slenderly narrowed from the root diameter of said parallel thread portion by means of form-rolling, such that the diameter of said neck portion being set to 96%-98% of the root diameter of said parallel thread portion, at the time of form-rolling said parallel thread portion and said transition thread portion.

6. The method for manufacturing a threaded fastener according to claim 5, wherein said underneck rounded portion is preformed at the time of head working in which said head is worked, and is finish worked at the time of form-rolling.

* * * * *